United States Patent [19]
MacLaren

[11] Patent Number: 5,388,316
[45] Date of Patent: Feb. 14, 1995

[54] BIOFILM SUPPORT MEDIA ASSEMBLY APPARATUS AND METHOD

[75] Inventor: David S. MacLaren, Gates Mills, Ohio

[73] Assignee: Jet, Inc., Cleveland, Ohio

[21] Appl. No.: 18,438

[22] Filed: Feb. 16, 1993

[51] Int. Cl.$^6$ .......................................... B25B 27/14
[52] U.S. Cl. .................... 29/281.5; 29/282; 269/47; 269/54.5
[58] Field of Search .............. 269/47, 52, 53, 54.4, 269/54.5; 29/281.5, 282, 283, 281.1, 241, 433

[56] References Cited

U.S. PATENT DOCUMENTS

| | | |
|---|---|---|
| 1,477,894 | 12/1923 | Perry . |
| 3,232,865 | 2/1966 | Quinn et al. . |
| 4,345,997 | 8/1982 | McConnell, Jr. et al. . |
| 4,623,454 | 11/1986 | Tauscher et al. . |
| 4,634,534 | 1/1987 | Cominetta et al. . |
| 4,666,593 | 5/1987 | Bosne . |
| 5,089,137 | 2/1992 | McKown . |
| 5,122,266 | 6/1992 | Kent . |
| 5,144,873 | 9/1992 | Nasu ................................ 269/54.5 |

*Primary Examiner*—Robert C. Watson
*Attorney, Agent, or Firm*—Jon L. Roberts; Thomas M. Champagne

[57] ABSTRACT

An apparatus and method for the assembly of biofilm support structure modules from individual sheets of biofilm support structure. The apparatus consists of a number of dowel rods protruding from a base. Hollow tubes are placed over the rods. Alignment holes are made in the biofilm support structure sheets such that the sheets may be slid over the tubes. When the required number of biofilm support structure sheets have been stacked in this fashion, caps are attached to the ends of the tubes, holding the biofilm support structure sheets in place. The assembled biofilm support structure modules may then be placed in a wastewater treatment plant. The tubes may also be used as passages for outside air or water, allowing the biofilm support structure sheets to be cleaned while still inside the treatment plant.

17 Claims, 6 Drawing Sheets 15 x 48 MEDIA STACK AS RECEIVED 15 x 22 1/2 MEDIA STACK AS RECEIVED COMPLETED 15 x 48 MEDIA MODULE
(2 REQUIRED PER PLANT)

COMPLETED 15 x 22 1/2 MEDIA MODULE
(2 REQUIRED PER PLANT)

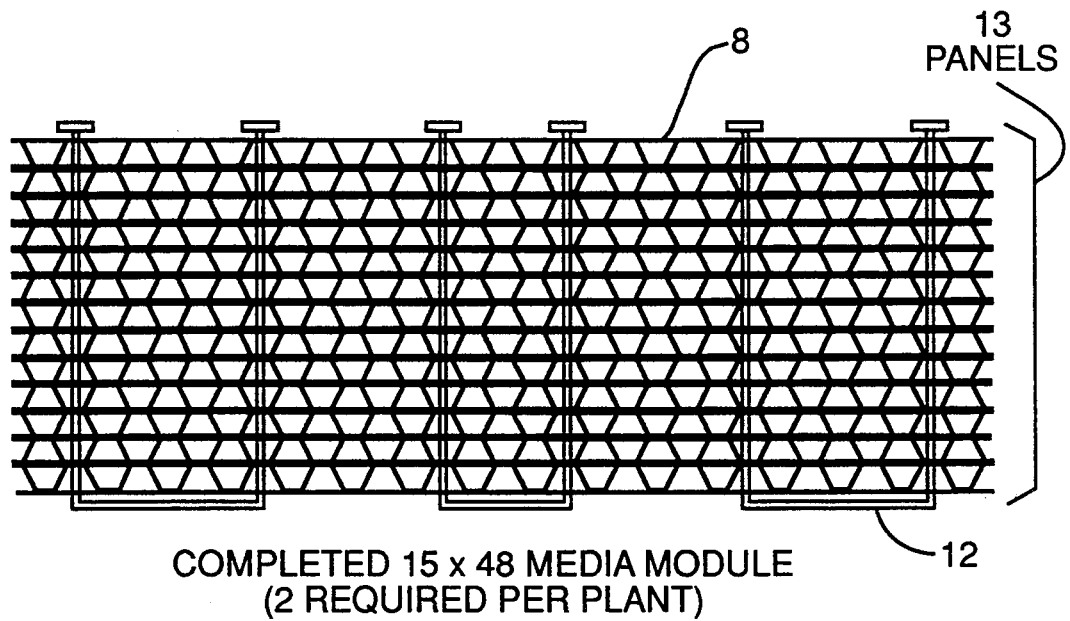
FIG. 6(a) COMPLETED 15 x 48 MEDIA MODULE (2 REQUIRED PER PLANT)
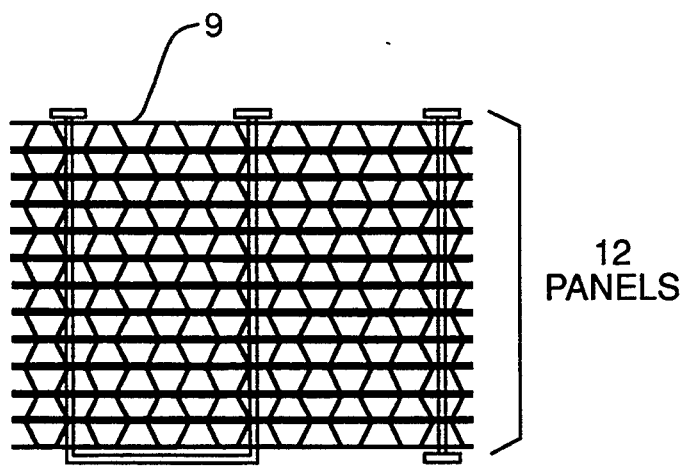
FIG. 6(b) COMPLETED 15 x 22 1/2 MEDIA MODULE (2 REQUIRED PER PLANT)

BIOFILM SUPPORT MEDIA ASSEMBLY APPARATUS AND METHOD

BACKGROUND OF THE INVENTION

1. Field of the Invention

The present invention relates generally to an assembly method for biofilm support structure modules used in the treatment of wastewater and to an apparatus used to effect this method. In particular, the present invention is directed toward a fast, simple method of assembling the biofilm support structure modules after shipping of individual components, saving on shipping costs and cutting down on assembly time compared with currently used assembly methods. It is also directed to an assembly fixture that is used to assemble the biofilm support structure modules from biofilm support structure sheets and module retainer tubes.

2. Background and Description of the Related Art

Biofilm refers to a layer of biologically active organisms which digest and hence eliminate organic matter from wastewater, thereby purifying the wastewater. In advanced applications of biofilm technology, biofilm is grown on or in a medium which acts as a carrier for such organisms. In some cases, the biofilm media are inorganic sheets or support structures which provide increased surface area on which the biofilm can grow.

Biofilm support structures have been used in wastewater treatment processes for more than fifteen years. These structures predominantly made of plastic, usually are installed in trickling filters or placed in wastewater treatment aeration tanks to treat and purify wastewater. Biofilm support structures are sold assembled in modules for small scale home wastewater treatment plants and in larger sizes for commercial wastewater treatment plants. Assembly of the modules takes place in factories or in the field using a gluing method. Using this method, individual sheets of the biofilm support structure are layered on top of one another, with waterproof glue spread between each layer to bind them. The biofilm support structure sheets are not flat. Rather, each sheet has a texture that is pleated in two roughly perpendicular directions, forming alternating rounded peaks and valleys. In assembled form, adjacent sheets are oriented in corrugated fashion. That is, the orientation of adjacent sheets alternates so that valleys in a particular sheet rest on peaks of the sheet below it. The peaks of the upper sheet in turn support the valleys of the sheet placed on top of it. The sheets alternate in this manner in order to provide more available surface area for the growth of biofilm. This in turn provides more treatment surface area for wastewater. In certain wastewater treatment applications the entire biofilm support structure modules are submerged in the fluid being treated within a wastewater treatment plant.

Because of the corrugated arrangement of the assembled biofilm support structure sheets in the assembled module, the factory assembled modules have a large shipping size, causing unnecessarily high freight costs. This cost could be reduced by assembling the modules in the field rather than before shipping. However, if the modules are assembled in the field using a gluing method, trained workers must travel to the assigned location to perform the assembly. The cost of the labor involved in this solution is ultimately much more expensive than the shipping costs incurred following assembly in the factory. A new method of assembling the biofilm support structure modules is therefore needed. This new method must be able to be performed in the field, but must be simple enough that trained workers are not necessary to carry it out, or must be quick and simple enough that assembly can be effected at a distribution plant after reception of the shipment from the factory.

SUMMARY OF THE INVENTION

The present invention comprises a module assembly fixture, to be used in conjunction with biofilm support structure sheets, module retainer tubes, and retainer caps. At the factory, the biofilm support structure sheets are first trimmed to the size required for the particular application. At least two holes are then made in each biofilm support structure sheet. The biofilm support structure sheets are then stacked together in a carton and shipped to the assigned location for installation, or to a distribution plant. The stacking arrangement used for shipping unassembled biofilm support structure sheets is different from that used in assembling the modules. The biofilm support structure sheets are nested; that is, all the sheets are oriented the same way, so that the peaks and valleys of all the sheets line up vertically. Stacked in this way, the volume of the biofilm support structure sheets is much smaller than that of the assembled biofilm support structure modules. For example, for a 500 gallon per day home wastewater treatment plant (a "plant"), the volume of an assembled biofilm support structure module is 21.78 cubic feet, but the volume of the nested stacked biofilm support structure sheets used to assemble the biofilm support structure module is only 3.79 cubic feet. Thus, the shipping volume is greatly reduced, saving in cost or allowing more biofilm support structure sheets to be shipped at the same time.

After the biofilm support structure sheets are shipped to the desired destination, the plant installer can easily assemble the biofilm support structure modules using the module assembly fixture. The module assembly fixture aids in a module assembly procedure, simplifying and speeding up the task.

The fixture comprises a base with extended dowel rods, and may be made of any sturdy material, such as metal or wood. The steps in the assembly procedure are as follows:

1. Slide module retainer tubes over the dowel rods.
2. Slide the biofilm support structure sheets onto the dowel rods, over the module retainer tubes, one at a time until the required thickness of biofilm support structure sheets is attained.
3. Glue the retainer caps onto the top ends of the retainer tubes.
4. Take the module out of the assembly fixture.
5. Turn the module over and glue retainer caps on the bottom ends of the retainer tubes.

After assembly in the above fashion, assembled biofilm support structure modules can be installed in the aeration tanks or trickling filters of wastewater treatment plants. The time required for assembly using the method of the present invention is much less than that required using a gluing method. Further, the method of the present invention requires much less exposure to the potentially toxic vapors of the glue that is normally used. The method of the present invention is also much simpler, obviating the need for specially trained workers to perform the task. During use within the wastewater treatment plant, the module retainer tubes can be used in the cleaning of the modules by connecting them to an outside water or air source.

It is therefore an object of the present invention to provide a biofilm support structure module assembly method which allows the module components to be shipped in a more compact form than factory-assembled biofilm support structure modules, substantially saving on shipping costs.

It is a further object of the present invention to provide a biofilm support structure module assembly method which is faster and easier than the gluing method, substantially saving on labor costs.

It is yet another object of the present invention to provide a biofilm support structure module that allows for biofilm support structure sheet cleaning by connecting module retainer tubes with an outside air source or water source.

It is still a further object of the present invention to provide a module assembly fixture to be used in performing the assembly method of the present invention.

It is an additional object of the present invention to provide an assembly method for a biofilm support structure module that is safer environmentally than are current methods, in that glue fumes are not dissipated into the atmosphere.

These and other objects and advantages of the present invention will be apparent to those persons skilled in the art upon examination of the detailed description of the invention, the drawing figures, and the appended claims.

BRIEF DESCRIPTION OF THE DRAWINGS

FIG. 6 is a diagram of an alternative embodiment of the present invention.

DETAILED DESCRIPTION OF THE INVENTION

The detailed description of the present invention is based on a home wastewater treatment plant which is designed to process 500 gallons of fluid per day. All dimensions and numbers used in the description are based on the amount of biofilm support structure necessary for such a treatment plant. The sizes of the biofilm support structure sheets, the dimensions of the module assembly fixture, the number of dowel rods, and other dimensions and quantities specified may vary with the size and type of fluid treatment plant contemplated for use with the present invention. Thus, numbers specified herein are not limitations on the scope of the present invention but are merely illustrative of one particular application.

Figure 1A:
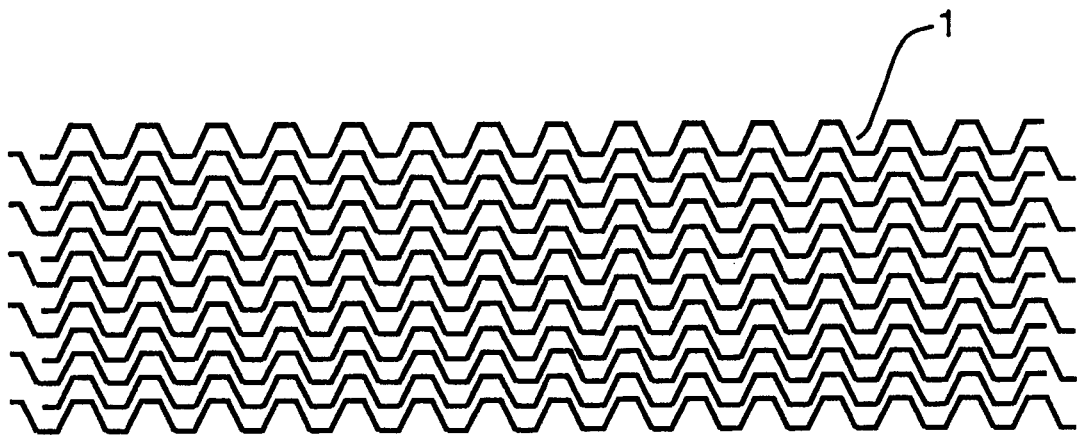
FIG. 1 is a diagram of the biofilm support structure sheets stacked for shipping.
Figure 1B:
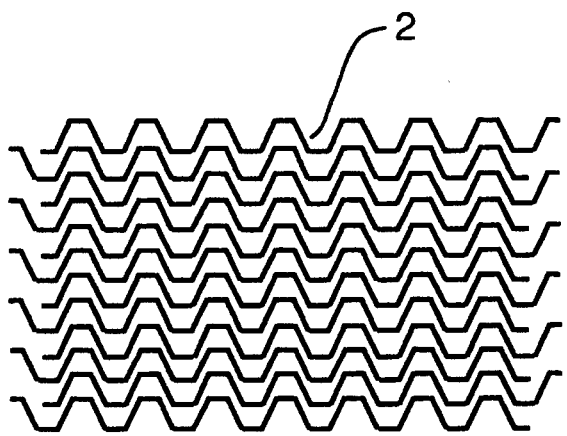

FIG. 1 shows nested sheets of biofilm support structure, stacked as they would be for shipping from the factory to the plant installer. As shown, alternating biofilm support structure sheets are rotated 180 degrees before packing in order to effect the nesting arrangement. This method of stacking is preferred, as it saves time (and therefore money) during assembly of the modules. However, stacking the biofilm support structure sheets in a nesting configuration without rotating alternating sheets is compatible with the present invention. Both long sheets 1 and short sheets 2 of biofilm support structure are required for the wastewater treatment plant, which utilizes two long modules and two short modules. The long sheets 1 are rectangles 15 inches by 48 inches in dimension and the short sheets 2 are rectangles 15 inches by 22½ inches in dimension. Twenty-six long sheets 1 and twenty-four short sheets 2 are required for one home wastewater treatment plant. The biofilm support structure stacks, nested as shown, are packed in a 57.5 inch by 16.25 inch by 7 inch carton and shipped to a plant installer. This carton occupies a volume of 3.79 cubic feet. The volume of an assembled biofilm support structure module using the same sheets of support structure is 21.78 cubic feet. Thus, shipping the biofilm support structure module in unassembled form results in a savings of 82.6 percent of the assembled biofilm support structure module shipping volume. The savings in shipping costs associated with this reduction in volume is substantial.

Figure 2:
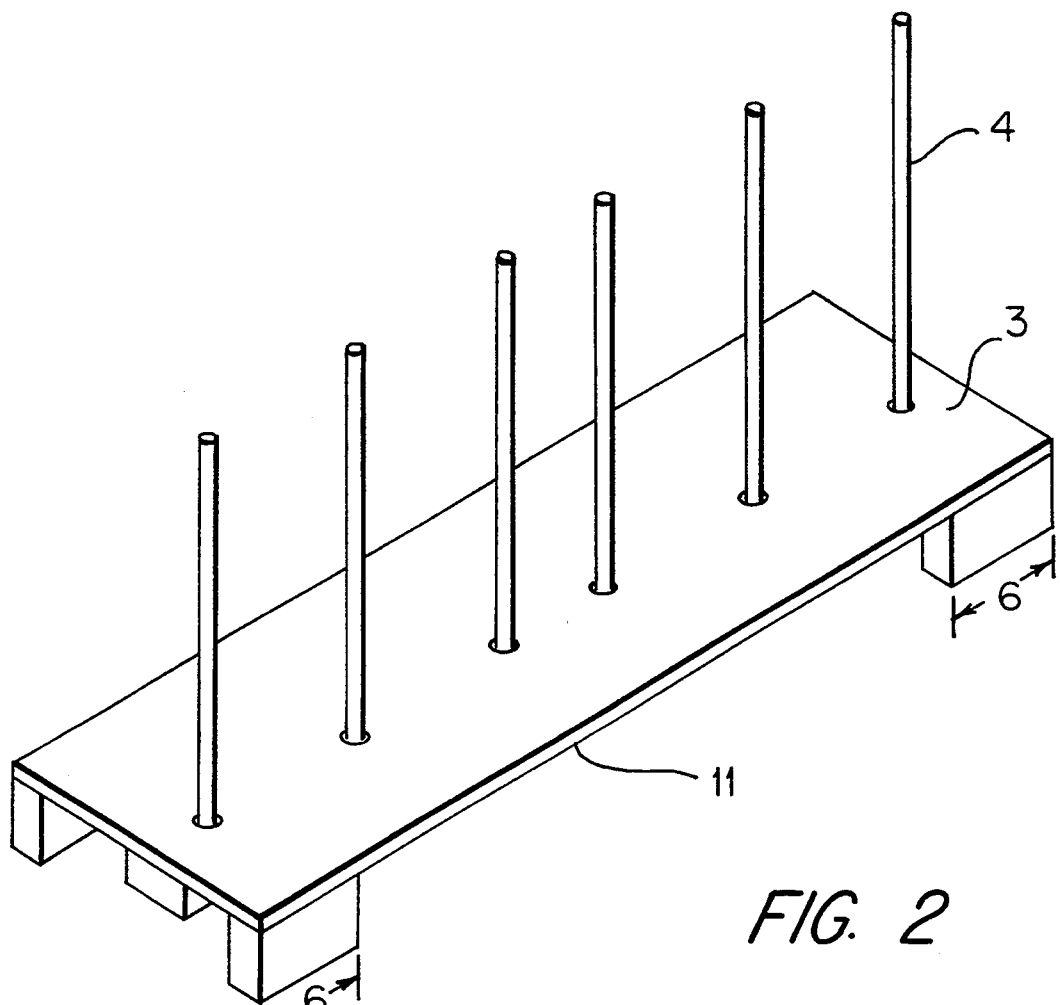
FIG. 2 is a diagram of the module assembly fixture.

The module assembly fixture 3 is shown in FIG. 2. The plant installer uses the module assembly fixture 3 to assemble the biofilm support structure modules from the biofilm support structure sheets. The module assembly fixture consists of a base 11 supporting a number of dowel rods 4. The dowel rods 4 protrude from the base 11 at some angle, preferably 90 degrees. The dowel rods 4 are of a length that is equal to or less than the thickness of a biofilm support structure module. The dowel rods 4 act as an aligning means for components of the biofilm support structure module.

Figure 3:
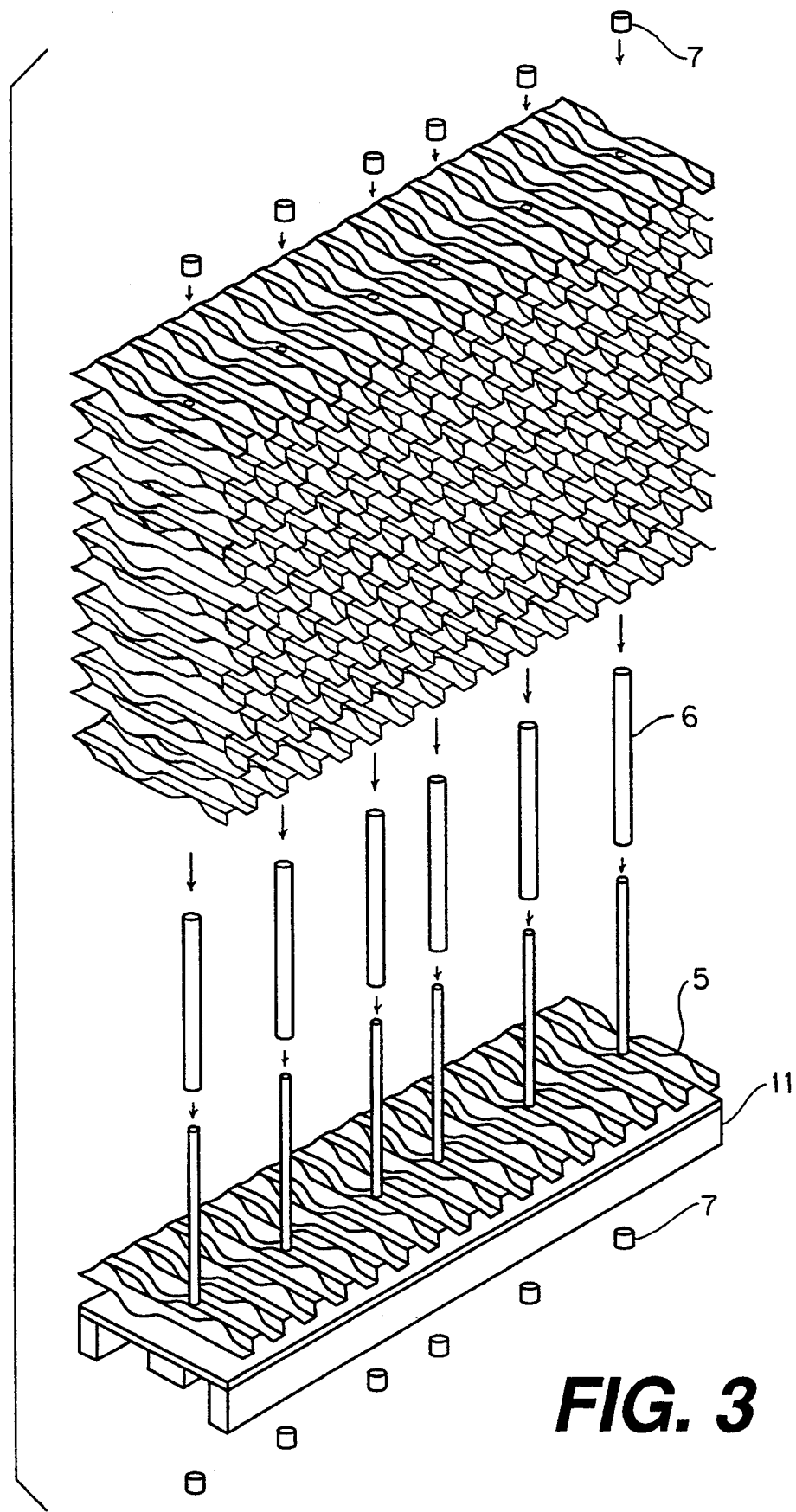
FIG. 3 is an exploded view of the biofilm support structure module, illustrating the assembly procedure.

As shown in FIG. 3, hollow module retainer tubes 6 are slid over the dowel rods 4. Each module retainer tube 6 is a hollow cylinder having a cylindrical outside wall and a bore through its longitudinal axis. At least one end of each module retainer tube 6, the bottom end, is open.

A first biofilm support structure sheet 5 is moved from the stack of long sheets 1 or the stack of short sheets 2 and is placed on the assembly fixture 3 by sliding the holes in the biofilm support structure sheets over the dowel rods 4. A second biofilm support structure sheet is then placed on top of the first biofilm support structure sheet 5 so that the two sheets are oriented in corrugated fashion. If the sheets were shipped stacked in the preferred manner, as shown in FIG. 1, the second biofilm support structure sheet is placed on the first without rotating the second biofilm support structure sheet; the second biofilm support structure sheet is simply moved by a distance of one pleat so that there is a corrugated arrangement rather than a nesting one. If the biofilm support structure sheets were not shipped stacked as shown in FIG. 1, the second biofilm support structure sheet may have to be rotated 180 degrees with respect to the first biofilm support structure sheet in order to effect the proper corrugated orientation. The holes made in the biofilm support structure sheets and the alignment function of the dowel rods 4 ensures that the sheets will be oriented properly.

The above process is repeated until all the required biofilm support structure sheets have been stacked on the assembly fixture 3. Thirteen long sheets 1 are required for each of the two long modules and twelve short sheets 2 are required for each of the two short modules.

Figure 4A:
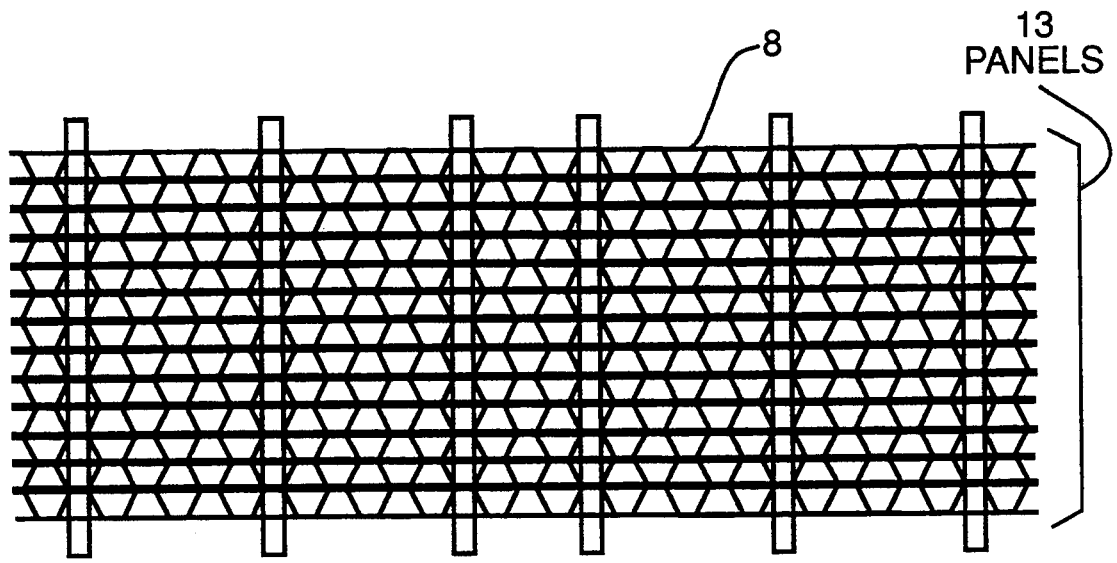
FIG. 4 shows completed biofilm support structure modules.
Figure 4B:
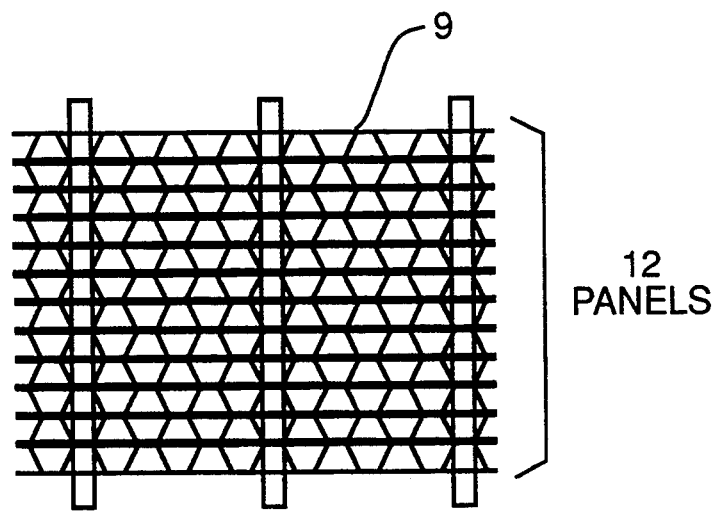

After the required number of biofilm support structure sheets are placed on the assembly fixture 3, retainer caps 7 are glued onto the top ends of the module retainer tubes 6. The plant installer then holds the bottom of the first biofilm support structure sheet 5 and lifts the entire biofilm support structure module off the assembly fixture 3. The module is turned over and retainer caps 7 are glued onto the bottom ends of the module retainer tubes 6. The assembly of the biofilm support structure module is now complete. FIG. 4 shows completed long and short biofilm support structure modules 8 and 9.

In alternative embodiments, the retainer caps 7 may be fastened to the module retainer tubes 6 in a manner other than gluing. The attachment means may be a clip which fits around the retainer cap 7 and holds the retainer cap 7 in place. The ends of module retainer tubes 6 may be threaded, either on the inside surface, the outside surface, or on both surfaces, so as to mate with threaded retainer caps 7. The module retainer tubes 6 may have annular ridges which mate with annular tabs on the retainer caps 7. The bottom ends of the module retainer tubes 6 may not require retainer caps 7 at all; an embodiment of the present invention may utilize module retainer tubes 6 having outwardly extending lips on the bottom ends, the diameter of the lips being large enough to hold the biofilm support structure sheets in place. The exact fastening means used is not a limiting feature of the present invention. What is important is that the biofilm support structure sheets be securely attached to the module retainer tubes 6.

Figure 5:
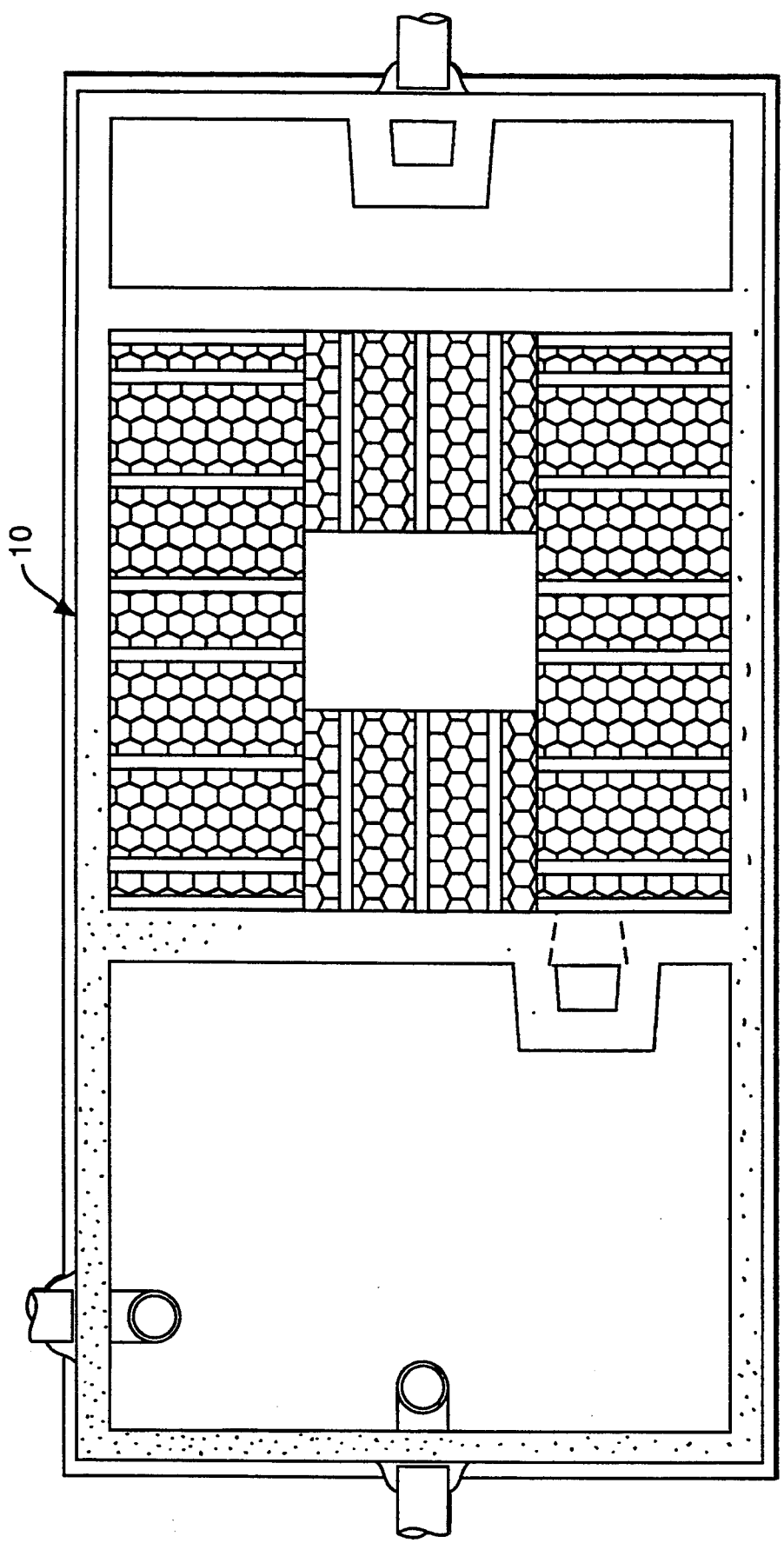
FIG. 5 is a diagram (top view) showing several biofilm support structure modules installed in a home wastewater treatment plant.

The above process is repeated until all the biofilm support structure modules necessary for the given application are complete. The completed long biofilm support structure modules 8 and short biofilm support structure modules 9 are then packed into an aeration compartment 10, as shown in FIG. 5.

The diameter of the dowel rods 4 can be any size, as long as it is smaller than the inside diameter of the module retainer tubes 6. In the preferred embodiment, the diameter of the dowel rods 4 varies from $\frac{1}{4}$ inch to $\frac{7}{8}$ inch, and the inside diameter of the module retainer tubes 6 varies from $\frac{1}{2}$ inch to 1 inch. The module retainer tubes 6 are of a length sufficient to approximately span the thickness of a biofilm support structure module. In some cases, the module retainer tubes 6 are slightly shorter than the thickness of the biofilm support structure module, so that the biofilm support structure sheets must be compressed in order to attach retainer caps 7. These biofilm support structure modules are used in applications in which the biofilm support structure sheets must be tightly bound. In other cases, the module retainer tubes 6 are slightly longer than the thickness of the biofilm support structure module. These biofilm support structure modules are used in applications in which the biofilm support structure sheets are to be given more freedom of movement within the wastewater treatment plant. In the preferred embodiment, the length of the module retainer tubes 6 is from two inches shorter to one inch longer than the thickness of the biofilm support structure module. The module retainer tubes 6 and retainer caps 7 may be made from PVC or other plastic material.

The described method of assembling the biofilm support structure modules is simple and quick. Compared with the various gluing methods prevalent in the art, module assembly time is reduced from 50 to 85 percent using the method of the present invention. Thus, labor expenses are greatly reduced, as is exposure of assemblers to potentially toxic glue fumes.

The present invention can be used to assemble biofilm support structure modules constructed from any material and manufactured in any shape. It therefore has much broader application than any of the prevalently used gluing methods, which may only be used with PVC materials.

The module assembly fixture 3 may be made of any sturdy material, and is preferably made of wood or metal. The number of dowel rods 4 used and the distance between adjacent dowel rods 4 is determined by the size of the biofilm support structure sheet, the distance between the valleys on the sheet, the material used to construct the biofilm support structure sheet, and the shape of the biofilm support structure sheet. The dowel rods 4 should be spaced close enough together so that a biofilm support structure module assembled on the assembly fixture 3 is held securely together. The holes in the biofilm support structure sheets corresponding to the dowel rods 4 may be drilled, cut, stamped, or otherwise provided at the factory prior to shipping in order to save labor costs at the plant. It will be appreciated by those skilled in the art that the inter-dowel rod distance may be adjusted in an alternative embodiment of the invention so that different structures and applications may be accommodated by merely sliding and then securing the dowel rods 4 at an inter-dowel rod distance appropriate to the application.

In an alternate embodiment, shown in FIG. 6, U-shaped rod binders 12 are used in place of dowel rods 4. All retainer caps 7 may thus be attached without flipping the assembled biofilm support structure module.

The module retainer tubes 6 can also be utilized as orifice pipes. To be used in this manner, the module retainer tubes 6 are connected by at least one end with an outside air source or water source. Module cleaning can then be accomplished while the biofilm support structure modules are installed in the wastewater treatment plant by using outside air or water to flush the biofilm support structure module. To do this, the retainer caps 7 on at least one end of module retainer tubes 6 must be formed so as to allow liquid or air to pass through from the outside of the module retainer tubes 6 to the inside hollow portion of the module retainer tubes 6. For example, a hole may be made in the end of the retainer caps 7 and a hose or other conduit carrying the forced air or water can be connected to the retainer cap 7. As long as the outside diameter of the retainer caps 7 is larger than the holes in the biofilm support structure sheets, the biofilm support structure modules will be securely bound. The module retaining tubes 6 may be perforated with at least one hole, and preferrably with a number of holes, along their lengths to allow incoming air or water to flush the biofilm support structure sheets for cleaning purposes.

Figure 7:
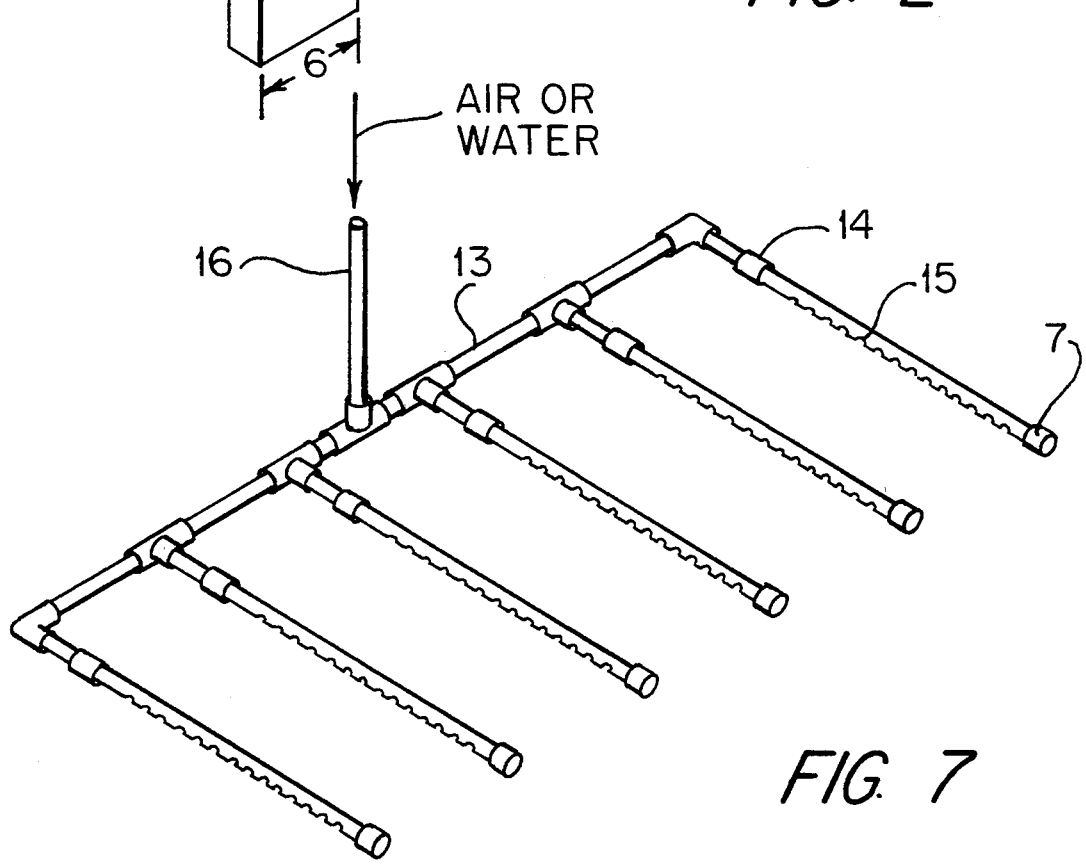
FIG. 7 is a diagram of the module retainer tube assembly configured for module cleaning.

FIG. 7 shows an example of a cleaning apparatus 13 which may be connected to the ends of the module retainer tubes 6 during the process of cleaning the modules. It is preferred that when the biofilm support structure module to be cleaned is installed in the water treatment plant, one end of at least some of the module retainer tubes 6 is located along the periphery of the plant or is otherwise available to the cleaning apparatus 13. The outlets of the cleaning apparatus 13 may be inserted into the retainer cap 7, or may be attached by a coupling means 14. The coupling means 14 may be a threaded sleeve or some other means for attaching the cleaning apparatus 13 to the retainer caps 7. Alternatively, the coupling means 14 may replace the retainer caps 7 on the ends of the module retainer tubes 6 that will be attached to the cleaning apparatus 13. The coupling means 14 will thus also perform the function of keeping the biofilm support structure sheets secured to the module retainer tubes 6.

Water or air enters the inlet 16 of the cleaning apparatus 13 and is distributed among the module retainer tubes 6 used in the biofilm support structure module. Retainer caps 7 fastened to the other ends of the module retainer tubes 6 prevent the water or air ("fluid") from flowing out those ends. The fluid is therefore forced out the holes 15 which perforate the module retainer tubes 6, flushing the nearby biofilm support structure sheets. Cleaning of the biofilm support structure sheets is accomplished in this manner.

Other cleaning apparatus 13 configurations are possible. If both ends of the module retainer tubes 6 are accessible, the cleaning apparatus 13 may be attached at both ends, or may be attached to one end on some of the module retainer tubes 6 and at the other end of the other module retainer tubes 6. In larger water treatment plants, the module retainer tubes 6 of adjacent biofilm support structure modules may line up so as to provide a longer flow path for incoming water or air. To allow cleaning of both biofilm support structure modules, the cleaning apparatus 13 is attached to the module retainer tubes 6 of a first biofilm support structure module. At least some of the module retainer tubes 6 in this first biofilm support structure module will not be perforated with holes 15. The retainer caps 7 on both ends of such module retainer tubes 6 are open, allowing the cleaning fluid to pass completely through the module retainer tube 6. The fluid will then flow into the open end of a module retainer tube 6 in the second biofilm support structure module. The module retainer tube 6 in this module will be perforated with holes 15, and the retainer cap 7 on the far end will be closed, in order to prevent further flow of fluid through the end of the module retainer tube 6 and forcing the fluid out of the holes 15. Thus, using the module retainer tubes 6 of the first biofilm support structure module as a fluid conduit, cleaning of the biofilm support structure sheets in the second biofilm support structure module is accomplished.

It will be recognized by persons skilled in the art that the apparatus and method of the present invention has applications beyond the construction of biofilm support structure modules. The present invention is an improvement over any process involving the binding of any sheet material having a similar structure in a stack or module. For example, certain commercial heating units or air conditioning units use sheets of fibrous filter material that are loosely bound in a stack. This filter material may have a structure similar to that of the biofilm support structure sheets. It is contemplated that the present invention would be applicable for use in the binding of such sheet material, and of any sheet material for any purpose.

Preferred and alternate embodiments of the present invention have now been described in detail. It is to be noted, however, that this description is merely illustrative of the principles underlying the inventive concept. It is, therefore, contemplated that various modifications of the disclosed embodiments will, without departing from the spirit and scope of the present invention, be apparent to persons skilled in the art.

What is claimed is:

1. An apparatus for the assembly of biofilm support structure modules, comprising:
    (a) a plurality of individual biofilm support structure sheets having a plurality of alignment holes, adjacent alignment holes separated by an inter-hole distance;
    (b) a base; and
    (c) a plurality of aligning means for aligning the biofilm support structure sheets during biofilm support structure module assembly, the aligning means attached to and extending from the base, there being a distance between each adjacent aligning means, the distance between each adjacent aligning means corresponding to the inter-hole distance.

2. The apparatus of claim 1, further comprising:
    (a) a plurality of hollow tube means for binding the individual biofilm support structure sheets together into a biofilm support structure module, each of the plurality of hollow tube means being slidably attached to one of the plurality of aligning means, and each hollow tube means having a cylindrical wall, a bore, a top end, and an open bottom end; and
    (b) a plurality of retainer caps;
    (c) each of the plurality of hollow tube means having one retainer cap attached to the top end of the hollow tube means and a second retainer cap attached to the bottom end of the hollow tube means.

3. The apparatus of claim 2 wherein the retainer cap attached to the bottom end of at least one of the plurality of hollow tube means has a passage means for allowing air and water from outside the hollow tube means to pass into the bore of the hollow tube means through the bottom end of the hollow tube means in order to clean the biofilm support structure sheets.

4. The apparatus of claim 2 wherein the top end of at least one of the plurality of hollow tube means is open and the retainer cap attached to the top end of the hollow tube means has a passage means for allowing air and water from outside the hollow tube means to pass into the bore of the hollow tube means through the bottom end of the hollow tube means in order to clean the biofilm support structure sheets.

5. The apparatus of claim 4 wherein the retainer cap attached to the bottom end of at least one of the plurality of hollow tube means has a passage means for allowing air and water from outside the hollow tube means to pass into the bore of the hollow tube means through the bottom end of the hollow tube means in order to clean the biofilm support structure sheets.

6. The apparatus of claim 2 wherein:
    (a) the cylindrical wall of at least one of the plurality of hollow tube means is perforated by at least one hole, forming a perforated hollow tube means; and
    (b) the retainer cap attached to the bottom end of the perforated hollow tube means has a passage means for allowing air and water from outside the perforated hollow tube means to pass into the bore of the perforated hollow tube means through the bottom end of the perforated hollow tube means in order to clean the biofilm support structure sheets.

7. The apparatus of claim 2 wherein:
    (a) the cylindrical wall of at least one of the plurality of hollow tube means is perforated by at least one hole, forming a perforated hollow tube means;

(b) the top end of the perforated hollow tube means is open; and (c) the retainer cap attached to the top end of the perforated hollow tube means has a passage means for allowing air and water from outside the perforated hollow tube means to pass into the bore of the perforated hollow tube means through the top end of the perforated hollow tube means in order to clean the biofilm support structure sheets.

8. The apparatus of claim 2 wherein:

(a) the cylindrical wall of at least one of the plurality of hollow tube means is perforated by at least one hole, forming a perforated hollow tube means;

(b) the retainer cap attached to the bottom end of the perforated hollow tube means has a passage means for allowing air and water from outside the perforated hollow tube means to pass into the bore of the perforated hollow tube means through the bottom end of the perforated hollow tube means in order to clean the biofilm support structure sheets;

(c) the top end of the perforated hollow tube means is open; and (d) the retainer cap attached to the top end of the perforated hollow tube means is open and has a passage means for allowing air and water from outside the perforated hollow tube means to pass into the bore of the perforated hollow tube means through the top end of the perforated hollow tube means in order to clean the biofilm support structure sheets.

9. An apparatus for the assembly of biofilm support structure modules from individual biofilm support structure sheets having a plurality of alignment holes, adjacent alignment holes separated by an inter-hole distance, comprising:

(a) a base;

(b) a plurality of aligning means for aligning the biofilm support structure sheets during biofilm support structure module assembly, the aligning means attached to and extending from the base, there being a distance between each adjacent aligning means, the distance between each adjacent aligning means corresponding to the inter-hole distance, (c) a plurality of hollow tube means for binding the individual biofilm support structure sheets together into a biofilm support structure module, each of the plurality of hollow tube means being slidably attached to one of the plurality of aligning means, and each hollow tube means having a cylindrical wall, a bore, a top end, and an open bottom end; and (d) a plurality of retainer caps;

(e) each of the plurality of hollow tube means having one retainer cap attached to the top end of the hollow tube means and a second retainer cap attached to the bottom end of the hollow tube means.

10. The apparatus of claim 9 wherein the retainer cap attached to the bottom end of at least one of the plurality of hollow tube means has a passage means for allowing air and water from outside the hollow tube means to pass into the bore of the hollow tube means through the bottom end of the hollow tube means in order to clean the biofilm support structure sheets.

11. The apparatus of claim 9 wherein the top end of at least one of the plurality of hollow tube means is open and retainer cap attached to the top end of the hollow tube means has a passage means for allowing air and water from outside the hollow tube means to pass into the bore of the hollow tube means through the bottom end of the hollow tube means in order to clean the biofilm support structure sheets.

12. The apparatus of claim 11 wherein the retainer cap attached to the bottom end of at least one of the plurality of hollow tube means has a passage means for allowing air and water from outside the hollow tube means to pass into the bore of the hollow tube means through the bottom end of the hollow tube means in order to clean the biofilm support structure sheets.

13. The apparatus of claim 9 wherein:

(a) the cylindrical wall of at least one of the plurality of hollow tube means is perforated by at least one hole, forming a perforated hollow tube means; and (b) the retainer cap attached to the bottom end of the perforated hollow tube means has a passage means for allowing air and water from outside the perforated hollow tube means to pass into the bore of the perforated hollow tube means through the bottom end of the perforated hollow tube means in order to clean the biofilm support structure sheets.

14. The apparatus of claim 9 wherein:

(a) the cylindrical wall of at least one of the plurality of hollow tube means is perforated by at least one hole, forming a perforated hollow tube means;

(b) the top end of the perforated hollow tube means is open; and (c) the retainer cap attached to the top end of the perforated hollow tube means has a passage means for allowing air and water from outside the perforated hollow tube means to pass into the bore of the perforated hollow tube means through the top end of the perforated hollow tube means in order to clean the biofilm support structure sheets.

15. The apparatus of claim 9 wherein:

(a) the cylindrical wall of at least one of the plurality of hollow tube means is perforated by at least one hole, forming a perforated hollow tube means;

(b) the retainer cap attached to the bottom end of the perforated hollow tube means has a passage means for allowing air and water from outside the perforated hollow tube means to pass into the bore of the perforated hollow tube means through the bottom end of the perforated hollow tube means in order to clean the biofilm support structure sheets;

(c) the top end of the perforated hollow tube means is open; and (d) the retainer cap attached to the top end of the perforated hollow tube means is open and has a passage means for allowing air and water from outside the perforated hollow tube means to pass into the bore of the perforated hollow tube means through the top end of the perforated hollow tube means in order to clean the biofilm support structure sheets.

16. An apparatus for the assembly of modules from sheet material having a plurality of alignment holes, adjacent alignment holes separated by an inter-hole distance, comprising:

(a) a base;

(b) a plurality of aligning means for aligning the sheet material during module assembly, the aligning means attached to and extending from the base, there being a distance between each adjacent aligning means, the distance between each adjacent aligning means corresponding to the inter-hole distance; and (c) a plurality of hollow tube means for binding the sheet material together into a module, each of the plurality of hollow tube means being slidably attached to one of the plurality of aligning means, and each hollow tube means having a cylindrical wall, a bore, a top end, and an open bottom end.

17. The apparatus of claim 16, further comprising
a plurality of retainer caps,
  each of the plurality of hollow tube means having one retainer cap attached to the top end of the hollow tube means and a second retainer cap attached to the bottom end of the hollow tube means.

* * * * *